Aug. 27, 1963    G. STENGER    3,101,572
CONSTRUCTION WITH BUILDING ELEMENTS MADE OF GLASS
Filed March 9, 1959
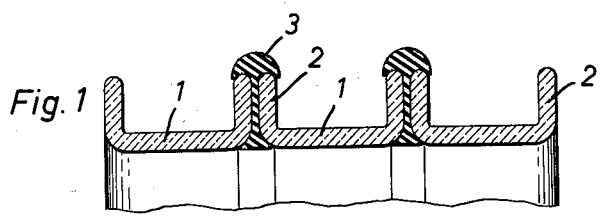
Fig. 1
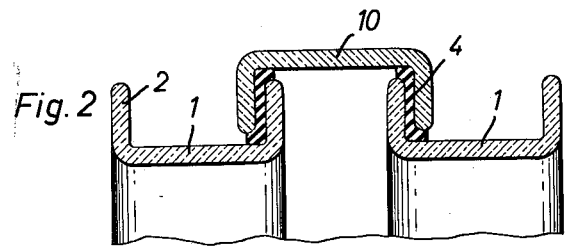
Fig. 2
Fig. 3
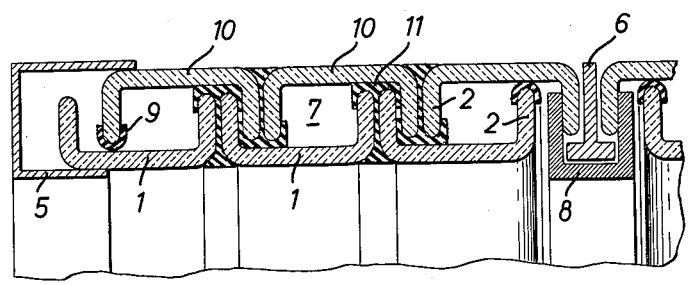
INVENTOR
GERT STENGER,
by
ATTORNEY United States Patent Office 3,101,572
Patented Aug. 27, 1963

3,101,572
CONSTRUCTION WITH BUILDING ELEMENTS
MADE OF GLASS
Gert Stenger, 1 Beerweg, Munich 25, Germany
Filed Mar. 9, 1959, Ser. No. 798,000
Claims priority, application Germany Mar. 11, 1958
2 Claims. (Cl. 50—267)

The present invention relates to hollow wall structures composed of structural members of substantially U-shaped cross-sectional configuration. More in particular, the invention relates to hollow wall structures of the type indicated in which the said structural members are made of glass and in which the said members may have a length of between less than one metre (three feet) and up to ten metres (33 ft.) or more. The wall structures of the invention may be used as the lateral walls of a room as well as to form horizontal or inclined floors, covers, roofs, intermediate ceilings and the like. While it has been known to construct walls and floors of prefabricated structural members which are connected together by suitable means such as cement mortar, concrete, adhesives, screw fastenings, nails, etc., the invention provides a wall structure in which the use of any such connecting means can be dispensed with, as the self-supporting structural members of U-shaped cross-section have merely to be arranged in side-by-side relationship, the interfaces between adjacent ones of the said members being sealed and the members being anchored together by the interposition of elastic filler strips. In order to hold the said structural members in position, it is only necessary to insert the ends of the channel-like members into suitable trough-shaped frame members and to afford lateral support by suitable locating means.

A wall or roof structure according to the invention comprising channel-like sections whose flanges extend in the direction of the vertical dimension of the wall, the said sections being arranged either in side-by-side relationship with slight gaps therebetween or being nested together, is characterized by the fact that the channels are made of glass and that elastic sealing or caulking strips are clamped in position between the opposed flanges of adjacent sections so as to provide interlocking of the sections as well as a sealing action.

While there have been known channel-like structural elements for walls, the flanges of such elements being disposed in interdigitating manner, the present invention affords an important advantage in that it renders it possible to construct glass walls without the use of screw fastenings; it will be understood that where it is intended to join glass sections to form a continuous wall there arises the problem of attaching the glass sections to one another without damaging them. Moreover, in order to avoid damage to the glass sections, the sections will have to be arranged in such a manner as not to come into direct mutual contact.

As has been mentioned earlier, the invention resides in the fact that the mutual attachment or connection between the glass members is actually provided for in a satisfactory and efficient manner by the clamping in position of spreading inserts or the like, this having been unknown to the art as far as structural members of U-shaped cross-section are concerned.

According to the invention it is possible to assemble glass walls of large area without the use of intermediate stiffening members of metal and the like. The strength of the walls of the invention is sufficient to withstand wind pressure. It is also possible, according to the invention, to construct curved walls and arches.

One of the important advantages of the invention is to be seen in the fact that the provision of elastic strips between opposing portions of adjacent members or sections permits the members or sections to be firmly connected together so that the sections support each other. A connection or attachment of this kind has heretofore been impossible in the case of glass sections. In the case of channel members made of a material other than glass, the members would be joined by means of screw fastenings or by the use of a suitable adhesive. These latter methods are not applicable to glass members, as they would be subject to breakage. Besides that, the glass sections have to be arranged in such a manner that they will not come into direct mutual contact. This latter requirement is fulfilled also by the aforementioned strips or inserts which also serve the purpose of providing an efficient seal at the joints between the sections and of compensating for the thermal expansion of the glass sections, thus relieving the sections of internal stresses.

Other objects and features of the invention will become apparent as the description proceeds, especially when taken in conjunction with the accompanying drawing, illustrating preferred embodiments of the invention, wherein:

FIG. 1 is a transverse cross-sectional view of a simple wall in which the structural elements are disposed in side-by-side relationship;

FIG. 2 is a transverse cross-sectional view of a wall composed of alternately oppositely facing structural elements, with the flanges of the elements being interengaged;

FIG. 3 is a transverse cross-sectional view of a double hollow wall composed of two layers or rows of oppositely facing channel-like elements in which each pair of oppositely facing elements defines a hollow space, the elements of each pair being laterally offset in relation to each other in such a manner that one flange of one of the two sections enclosing the next adjacent hollow space is engaged between two flanges of the said laterally offset elements.

In the embodiment of FIG. 1, the channel-shaped structural elements 1 made of glass are disposed with their adjacent flanges 2 extending parallel and facing in the same direction, and it will be seen from FIG. 1 that the space between each pair of elements, i.e. between the adjacent flanges, is occupied by an elastic insert 3 of generally T-shaped cross-section which may or may not overlie the free ends of the flanges 2.

In the embodiment of FIG. 2, the structural elements of U-shaped cross-section are arranged in such a manner that the flanges 2 of adjacent elements engage each other with their internal surfaces, the webs 1, 10, 1 of the elements thus forming a broken or meandering line. The flanges 2 of each co-operating pair are separated by substantially S-shaped sealing members or elastic inserts 4.

FIG. 3 illustrates still another embodiment in the form of a double hollow wall composed of structural elements 1, 10, etc. wherein the said elements are arranged in alternately oppositely facing positions with the elements offset with respect to each other so as to provide for interengagement of the oppositely facing elements by the interlocking action between the joined pairs of flanges of the oppositely facing offset elements as shown. Also the embodiment of FIG. 3 includes substantially T-shaped members 11 which are interposed between the various structural elements for the purpose of connecting and clamping them together by means of the cross-bar portions of the T-shaped sealing and anchoring member 11. The left-hand portion of FIG. 3 shows a connecting frame 5, while in the right-hand portion of FIG. 3 there is shown a connection between two wall sections, this connection comprising, for example, an iron T-section 6 and a channel 8 made of a suitable plastic material, the channel 8 overlying the head portion of the iron T-section 6 and two flanges of adjacent glass elements. Indicated at 9 in FIG. 3 is one of the covering members surrounding the ends of the free flanges of the glass elements.

The manner in which, according to the invention, the glass elements are elastically clamped together, with the clamping members also acting as efficient seals, affords a considerable advantage in that it greatly simplifies and facilitates the erection of any of the walls shown. Another advantage resides in the fact that no forces are set up which might result in any major local stresses in the material. In view of this fact, the structural members may be made of relatively delicate materials such as glass, thin-walled light-weight concrete and the like.

The structural elements can be erected without the use of forms or stiffening members. The hollow spaces defined by the elements may or may not be filled with any desired material and have excellent insulating properties. The structural elements require no finishing operations to be performed at the site of erection. It is also possible to combine structural members made of different materials, for example single glass elements or groups of glass elements with elements consisting of an opaque material. Furthermore, the structural elements may be made with different coloring, patterns or surface structures. In the case of the embodiment shown in FIG. 3, the elements of U-shaped cross-section are so disposed in relation to each other that there are no joint faces extending all the way from the external surface to the internal surface of the wall. This is achieved, according to the invention, by arranging the two oppositely facing elements of U-shaped cross-section which define a hollow space 7 in a laterally offset relation to one another so that one flange of an element defining the next adjacent hollow space is engaged between two flanges of the first-named elements.

What is claimed is:

1. A wall or the like providing opposite finished surface structures, each finished surface structure comprising a plurality of elongated frangible channel members having great lengths as compared to their widths arranged in mutually supporting side-by-side relation having outwardly facing main webs with inwardly directed side flanges extending therefrom, resilient substantially T-shaped sealing and anchoring strips coextensively disposed between adjacent side flanges, said T-shaped strips including resilient cross-bar portions, said cross-bar portions of said T-shaped strips resiliently engaging the free edges of adjacent side flanges and extending down the distal surfaces thereof to form pairs of resiliently joined side flanges, said pairs of resiliently joined side flanges of opposite finished surface structures directed inwardly toward each other and anchored in staggered abutting relation adjacent each other by the resilient cross-bar portions of said T-shaped strips bearing upon the main webs of opposite surface structures, and the portions extending down said distal surfaces thereof, such that adjacent staggered pairs of resiliently joined side flanges exert mutually supporting forces on each other to provide a wall structure having hollow portions therein and having a degree of flexure in the lateral plane without establishing side flange breaking stresses.

2. A wall or the like comprising a first set of elongated channels having great lengths as compared to their widths arranged in side-by-side mutually supporting relation having main webs facing outwardly to define a first finished wall surface and inwardly directed side flanges, a second set of elongated channels having great lengths as compared to their widths arranged in side-by-side mutually supporting relation and arranged in opposition to the first set of elongated channels, said second set of elongated channels having main webs facing outwardly to define a second finished wall surface and side flanges extending inwardly therefrom, a first set of generally T-shaped resilient seals including resilient transverse heads disposed between the first-named side flanges to form pairs of resiliently joined first-named side flanges, and a second set of generally T-shaped resilient seals including resilient transverse heads disposed between the second-named side flanges to form resiliently joined pairs of said second-named side flanges, the first- and second-named joined pairs of side flanges being disposed in laterally spaced pairs inwardly of the first- and second-named main webs with the transverse heads of the generally T-shaped resilient seals of the first-named side flanges disposed in abutment with the second-named main webs and the transverse heads of the generally T-shaped seals of the second-named side flanges disposed in abutment with the first-named main webs, and resilient side portions of the resilient transverse heads of the generally T-shaped seals extending in abutting relation between adjacent joined pairs of said first- and second-named side flanges such that said adjacent joined pairs exert mutually supporting forces on each other to form a resiliently interlocking wall structure having a degree of flexure from lateral alignment without establishing breaking stresses in the side flanges.

References Cited in the file of this patent

UNITED STATES PATENTS

| 1,439,494 | Wernette | Dec. 19, 1922 |
| 1,723,307 | Sipe | Aug. 6, 1929 |
| 2,064,790 | Faber | Dec. 15, 1936 |
| 2,129,369 | Faber | Sept. 6, 1938 |
| 2,141,000 | Hohl | Dec. 26, 1938 |
| 2,286,890 | Birt | June 16, 1942 |
| 2,878,535 | Bush | Mar. 24, 1959 |

FOREIGN PATENTS

| 470,835 | Great Britain | Nov. 16, 1935 |
| 532,339 | Great Britain | Jan. 22, 1941 |
| 100,537 | Sweden | Dec. 23, 1950 |